United States Patent [19]
Lee

[11] Patent Number: 6,107,760
[45] Date of Patent: Aug. 22, 2000

[54] NON-STOP VARIABLE AC MOTOR

[76] Inventor: Sang-Yoon Lee, 341-2, Janglim-2Dong, Saha-Gu Pusan, Rep. of Korea

[21] Appl. No.: 09/045,712

[22] Filed: Mar. 23, 1998

[30]  Foreign Application Priority Data

Apr. 7, 1997 [KR]  Rep. of Korea ...................... 97-13337

[51] Int. Cl.$^7$ ....................................................... H02P 5/00
[52] U.S. Cl. ........................... 318/138; 318/245; 318/254
[58] Field of Search ..................................... 318/138, 245, 318/254, 439, 652, 638, 632, 443, 85, 70, 656, 128; 324/158.1, 117 H, 117 R, 175; 310/68 B, 86, 52, 254, 905; 5/81 R, 83, 87; 505/1; 29/598, 447

[56]   References Cited

U.S. PATENT DOCUMENTS

| | | | |
|---|---|---|---|
| 4,082,968 | 4/1978 | Jones ....................................... | 310/68 B |
| 4,228,396 | 10/1980 | Palombo et al. ......................... | 324/163 |
| 4,443,724 | 4/1984 | Handlykken .............................. | 310/171 |
| 4,729,160 | 3/1988 | Brown ....................................... | 29/598 |
| 4,758,769 | 7/1988 | Carrigan et al. ......................... | 318/254 |
| 4,851,752 | 7/1989 | Nishimura et al. ...................... | 318/602 |
| 4,892,863 | 1/1990 | Agarwala .................................. | 505/1 |
| 4,944,056 | 7/1990 | Schroeder et al. ........................ | 5/81 R |
| 5,089,759 | 2/1992 | Miotke et al. ..................... | 318/568.11 |
| 5,126,641 | 6/1992 | Putman et al. ........................... | 318/128 |
| 5,198,738 | 3/1993 | Blaser et al. ............................. | 318/652 |
| 5,323,075 | 6/1994 | Denk et al. ............................ | 310/68 B |
| 5,331,257 | 7/1994 | Materne et al. ............................ | 318/85 |
| 5,355,061 | 10/1994 | Forhan .................................... | 318/443 |
| 5,418,451 | 5/1995 | Maass et al. .......................... | 324/158.1 |
| 5,764,714 | 8/1988 | Alley et al. ............................. | 318/786 |
| 5,900,709 | 5/1999 | Kanda et al. ............................. | 318/652 |

*Primary Examiner*—Paul Ip

[57]   ABSTRACT

As stated earlier, the technical purpose of the present invention is to solve inconvenience in use and installation of the AC motor with a controller, and to provide the AC motor available for mass production at a low cost by installing an airtight and compact controller within the case of the AC motor and by setting the sensing wheel in one part of the driving shaft making it possible for the rotative speed primary means integrated to the said controller to sense the driving speed.

3 Claims, 7 Drawing Sheets

NON-STOP VARIABLE AC MOTOR

A small compact Driver is mounted to the one end of a motor for reducing the weight and size of a control box which leads easy move and wiring of the motor and minimizing the restriction in using a motor in small space. The Driver is located right underneath a sensing wheel mounted to the axle of the motor.

BACKGROUND OF THE INVENTION

This invention relates in general to a variable motor and more particularly to the location of a embedded Driver [or Driver Section,] which controls the phase of 3 phase AC Voltage to rotate motor.

Because the control box should be moved together with motors it has been very inconvenient and troublesome to use motors needing a large control box which is adopted in present commercial motors such as V.S Motor, DC Motor, TS Motor and Inverter etc.

To clear these inconveniences and reduce manufacturing expense, the Driver which controls the phase of 3 phase AC Voltage is fabricated more compact and embedded in a motor. For indication and control of speed of a motor, a small and compact Controller is developed to be used with connecting cable being able to rotate motor at any distance needed. [4"(L)×2.4"(W)×0.6"(H) is the palm size of the Controller.]

In other words this invention employs two small electronic components to revolve the motor. One is the Driver which is designed compact and embedded in the motor performs phase control of Voltage. The other is the Controller used with cable to remotely control a motor.

SUMMARY OF THE INVENTION

The object of this invention is to provide a Driver, or Voltage Control Circuit, mounted to a motor which results in a compact type motor.

To compact 3 Phase AC Voltage Control Circuit, a specific design is needed and a Controller to run this circuit is made to be easily manipulated.

Compactness of a motor and the Driver minimizes motor installing space, reduces purchasing expenditure and reinforces capability and accuracy of the motor.

The Driver embedded in motor controls the phase of 3 phase AC Voltage through IC and Triac, and this phase controlled Voltage rotates the motor.

At the same time a Sensing Wheel mounted to motor axle perceives rotating speed of the motor as signals and feeds signals to the Controller. [These speed signals are compared to the default speed value programmed in CPU(micro-Controller)and at the same time] And the Controller sends Control Signal to the Driver to adjust current motor rotating speed to default speed.

[For Controller, PI controller is installed on microcontroller programmed by using assembly language. 8 bit A/D converter embedded in 91c16C73 of Microchip is used as a microcontroller.

This microcontroller is programmed to have variable functions of Soft-Start, Soft-Stop, Data Archive and Overload Protection.]

Therefore the result of complex electric process can be controlled by the Driver capable of being embedded compactly onto any size of motors so motor users get benefit of low expense and easy operation.

DETAILED DESCRIPTION OF THE PREFERRED EMBODIMENT

Figure 1:
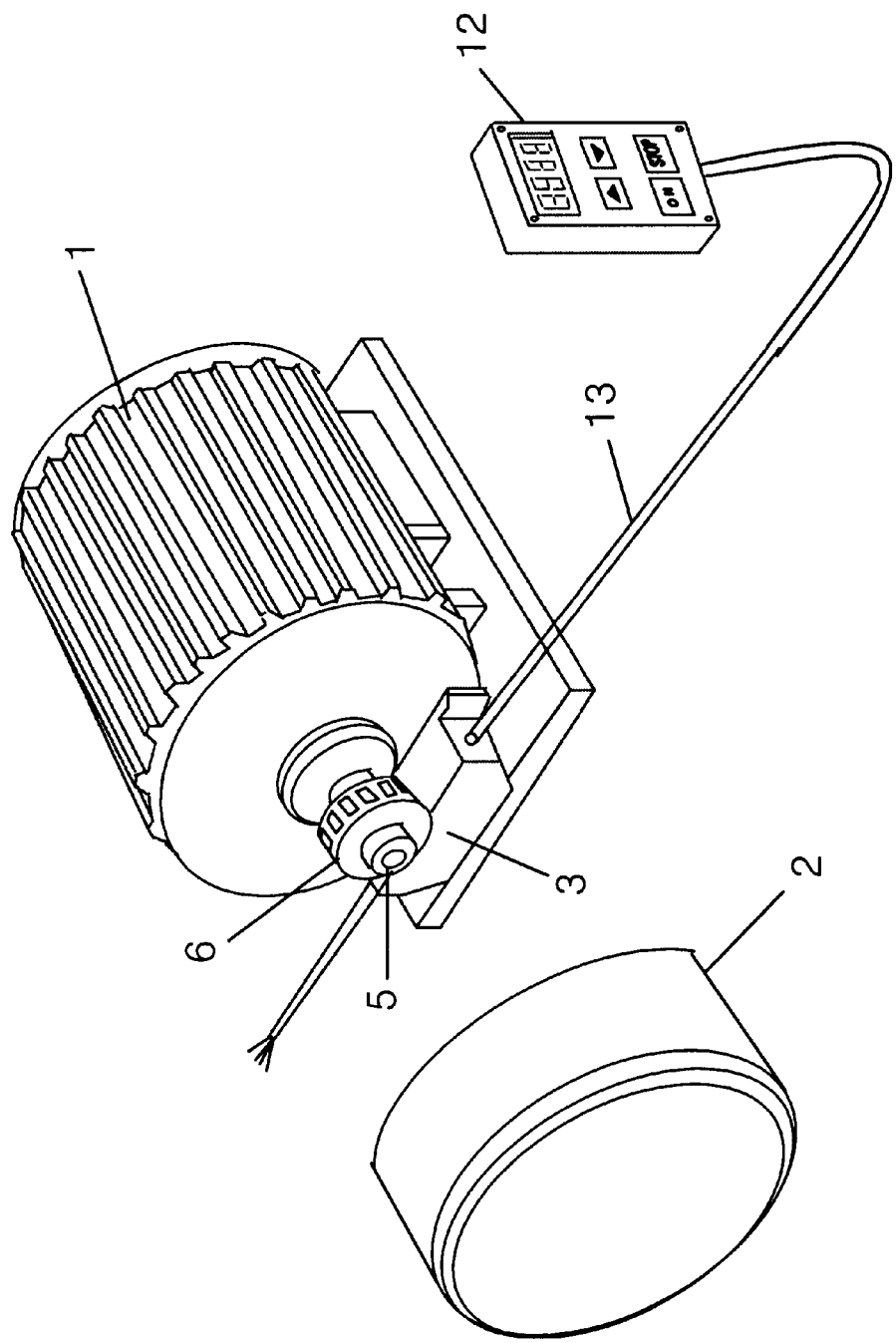
FIG. 1 is a motor main body 1, a Driver 3, a Controller 12 and a Sensing Wheel 6.

FIG. 1 is main body 1 and cover 2 which are took apart from a motor, a sensing wheel 6 which detects motor rotating speed and is attached on the motor axle 5, a Driver 3 which is under the sensing wheel 6 and phase controls the 3 phase AC incident Voltage, and last a Controller 12 which is connected with cable 13, governs the phase of the Driver 3 and rotating speed and indicates motor speed. When the Cover 2 is put on main body 1, the Driver 3 is inside the motor instead of inside a large control box which is now adapted in commercial motors. Motor rotating speed required is governed by manipulating the Controller 12.

Figure 2:
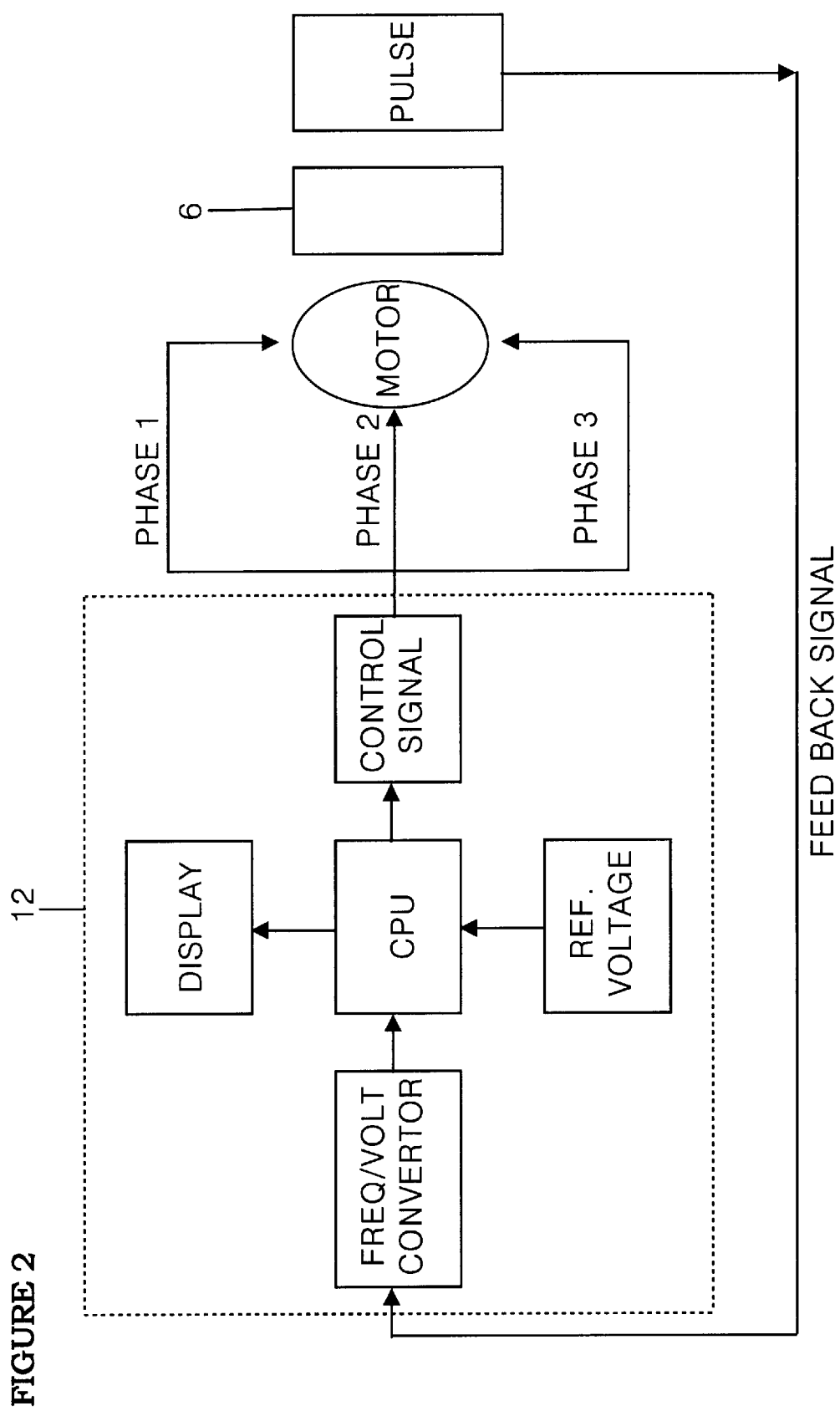
FIG. 2 is a diagrammatic presentation of the Driver 3 and the Controller 12.

FIG. 2 is electric circuits running a motor. The function of the Controller 12 and the Driver 3 is indicated step by step with blocks. The Driver 3 is Printed Circuit Board embedded in the motor where 3 phase AC Voltage(220V, 380V, 440V) is provided [by R.S.T.]

In phase detection step, pulses related to incidence Voltage are created and the phase of those created pulses are changed in phase shift step. Then phase controlled AC Voltage is created and rotates a motor. At this last step, a sensing wheel 6 mounted to motor axle perceives motor rotating speed as signals and sends[(feed-backs)] signals to Frequency/Voltage Converter of the Controller 12. These speed signals are compared to the default speed programmed on CPU[(micro-Controller)] and at the same time the Controller 12 sends Control Signal to the Driver 3 to phase-control 3 phase AC Voltage.

Figure 3:
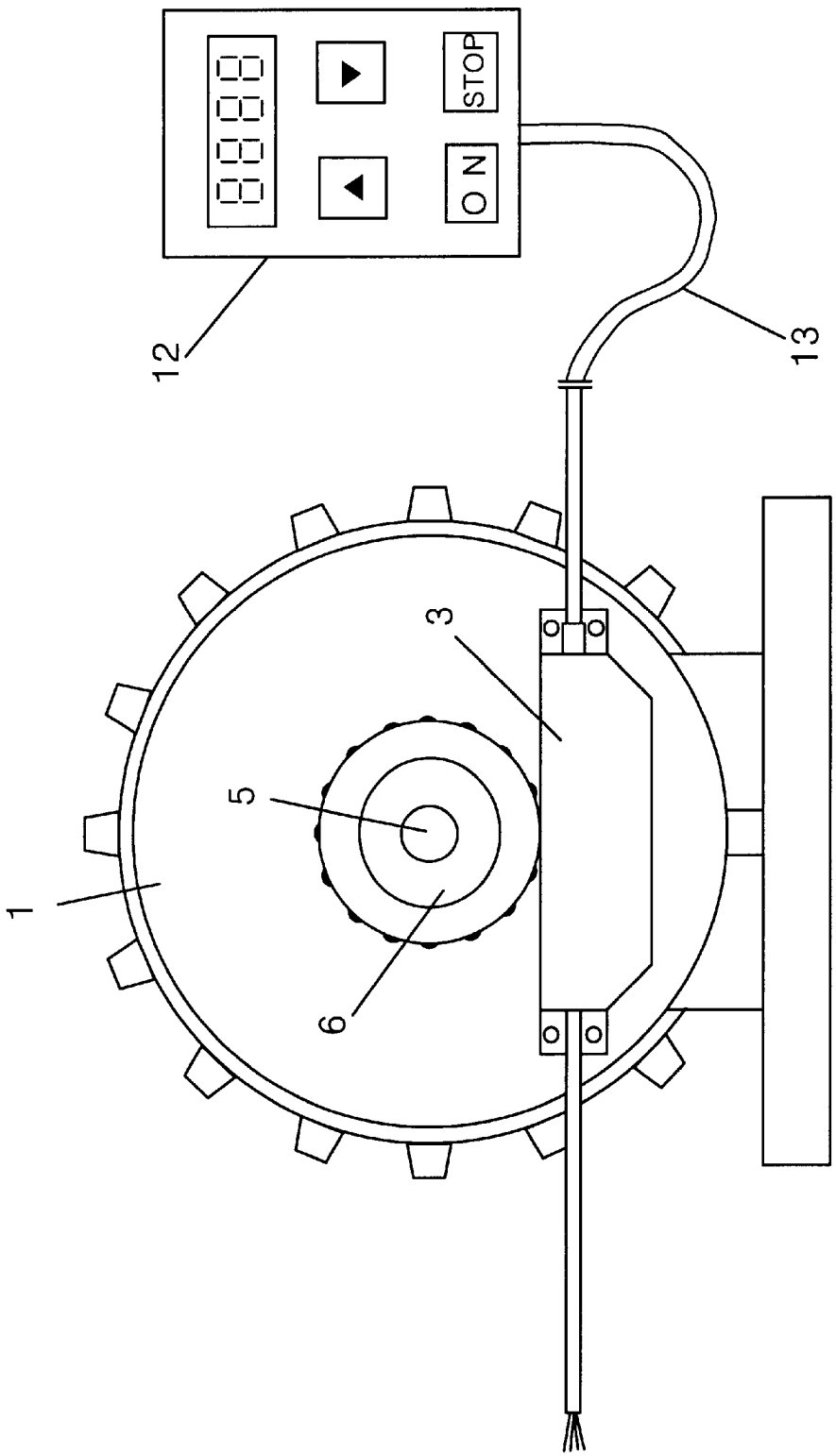
FIG. 3 is a cross section view of a motor showing the embedded location of the Driver 3 and the Sensing Wheel 6.

FIG. 3 is a cross section view of a motor main body and shows that a Driver 3, a Controller 12 a connecting cable 13, a Sensing Wheel 6 mounted to motor axle 5 where the sensing terminals 7 and 8 made of aluminum copper are inserted into their clamping slots 9 and 10 in the external part at regular intervals. Before this invention a Driver and a Controller are put together in a separated large box, which causes inconvenience and requires large space to build. To clear those problems the Driver is made even smaller than before and embedded in a motor.

Figure 4:
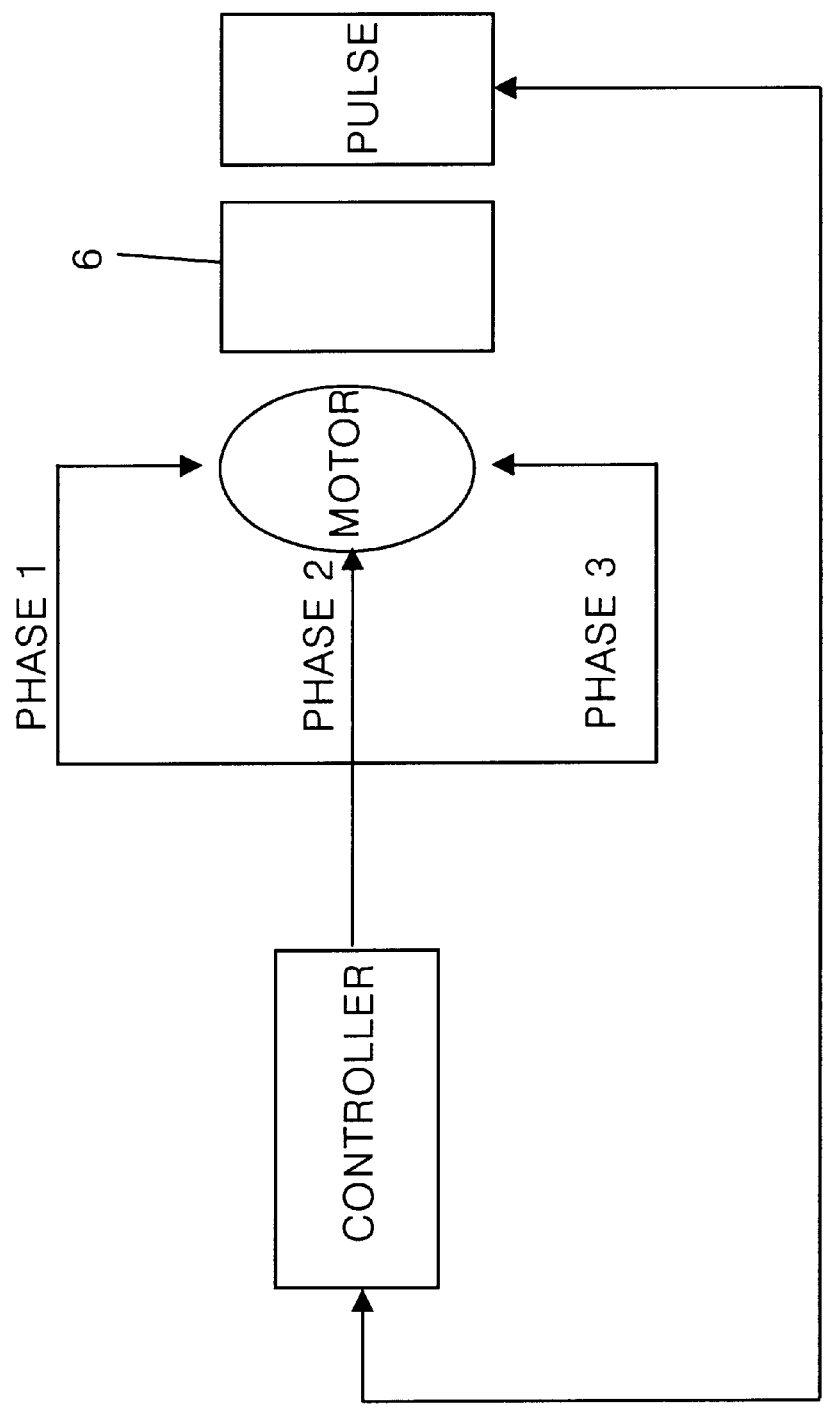
FIG. 4 is a diagrammatic presentation of the phase control circuit of the Driver 3.

FIG. 4 is a diagrammatic presentation of the phase control circuit of the Driver 3 of FIGS. 1 and 3.

3 phase AC Voltage [which is provided by R.S.T] makes a required Voltage by phase detection, phase shift and phase control and it is fed to a motor to rotate it. The Sensing Wheel 6 perceives motor rotating speed, changes motor rotating speed to a specific value which can be perceived by CPU and then feeds the specific value to the Controller 12 which makes correction value to adjust current speed to default value [(speed)]. The correction value is provided to the Driver 3 which controls the phase of AC Voltage to be fed to a motor.

Figure 5:
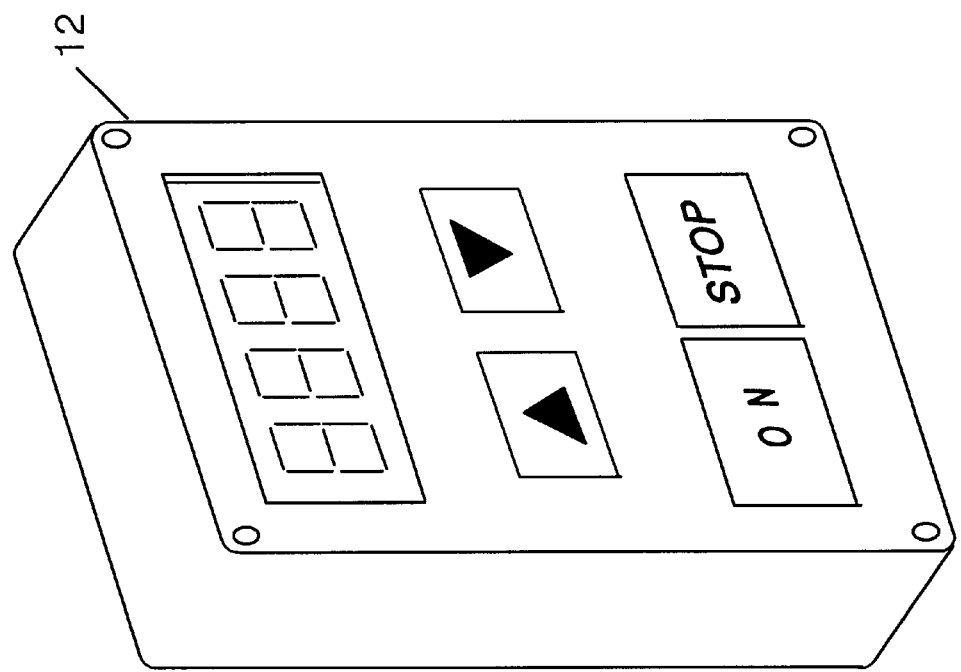
FIG. 5 is the Controller 12.

FIG. 5 is the Controller

Push [on] button to rotate a motor and push [stop] button op rotating a motor. Up button [▲] is to increase rotating speed and down buttons [▲] to decrease the speed. Current rotating speed in indicated on Display.

Figure 6:
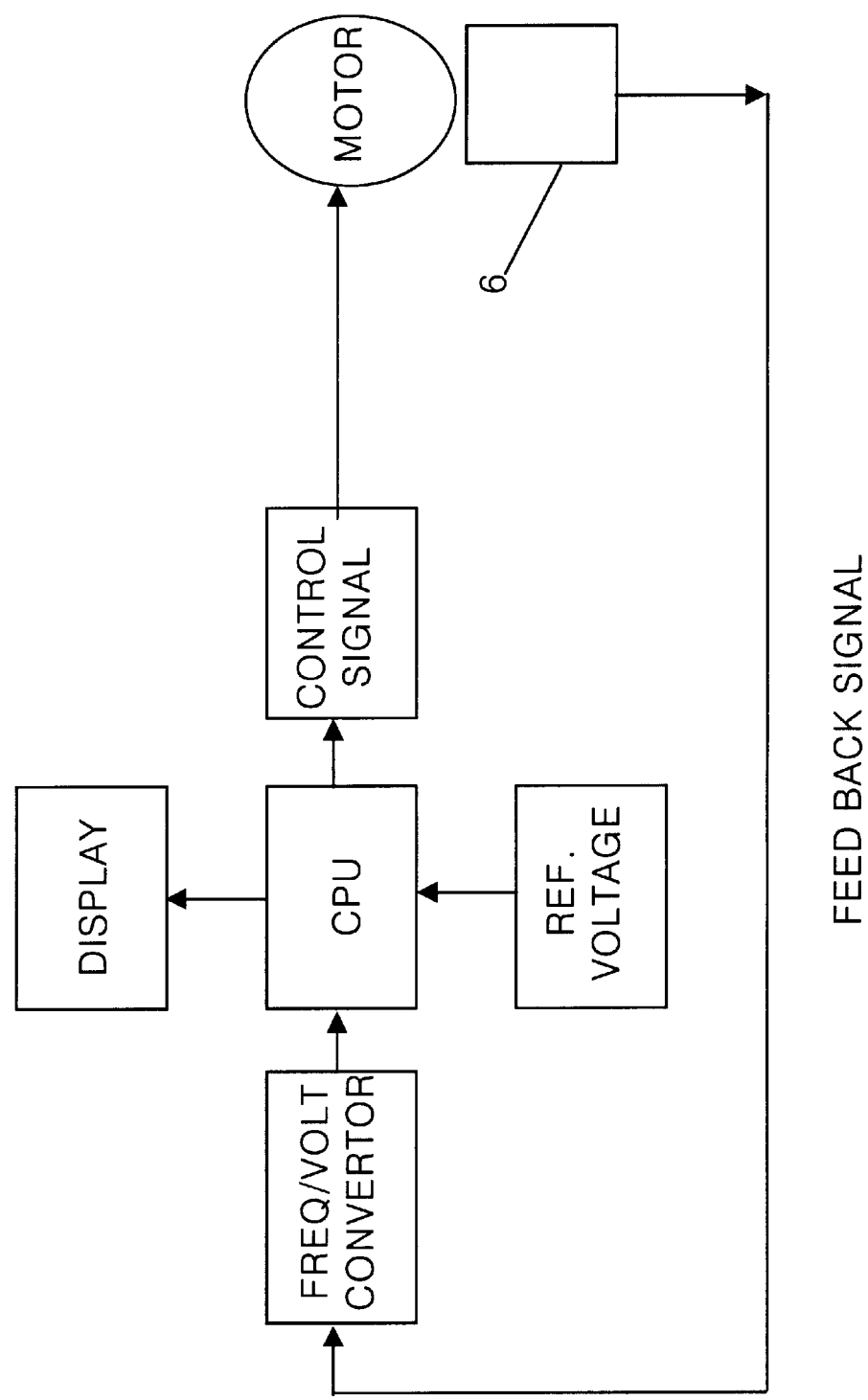
FIG. 6 is a diagrammatic presentation of the Controller 12 for speed adjustment and display

FIG. 6 is a diagrammatic presentation of the Controller 12.

The Controller 12 shows current rotating speed and controls the motor rotating speed at the same time.

3 phase AC Voltage controlled by the Driver 3 rotates a motor. The Sensing Wheel 6 perceives motor rotating speed signals, changes them to a specific value which can be perceived by CPU and feeds the specific value to the Controller 12. CPU of the Controller 12 compares the specific value with default value programmed in. If the specific value deviate from the default value, CPU causes the Driver 3 to correct rotating speed up or down by the amount of deviation.

Figure 7:
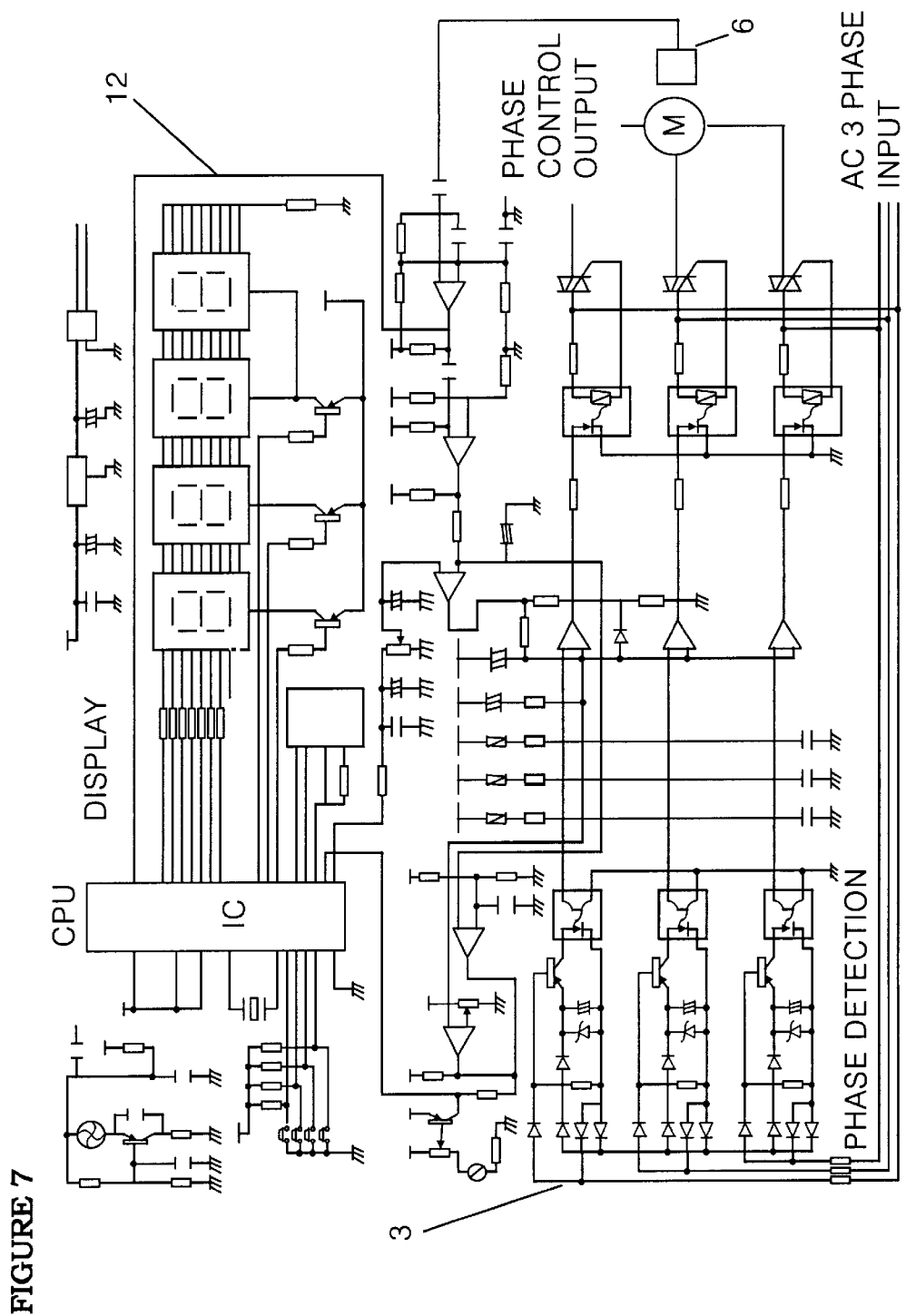
FIG. 7 is a detailed schematic diagram of the Driver 3 and the Controller 12 for rotating a motor

FIG. 7 is a detailed schematic diagram of the Driver 3 and the Controller 12 for rotating a motor.

3 phase AC voltage is fed into the Driver 3. Pulse is detected at phase detection section and the phase of pulse is changed at phase shift section. Triac controls the pulse phase and feeds it to a motor. The Sensing Wheel 6 perceives motor rotating speed and sends it to controller 12 CPU to compare and adjust to default value previously programmed in. Current speed is indicated on the Controller.

What is claimed is:

1. A portable driving device for controlling a rotor of a motor comprising:

a sensing wheel attachment mounted on the rotor wherein sensing terminals are inserted into clamping slots of the sensing wheel;

a driver attachment mounted close to the sensing wheel inside the motor for sensing and driving the rotor; and a portable controller connected to the driver for remote control of the driver.

2. The portable driving device according to claim 1 wherein the sensing wheel is made of synthetic resin.

3. The portable driving device according to claim 1 wherein the sensing terminals is made of aluminum or copper.

* * * * *